(12) United States Patent
Johnson et al.

(10) Patent No.: US 7,124,041 B1
(45) Date of Patent: Oct. 17, 2006

(54) SYSTEMS, METHODS, AND DEVICES FOR DETECTING CIRCUIT FAULTS

(75) Inventors: Charles Johnson, Gray, TN (US); Alan Weddle, Watauga, TN (US)

(73) Assignee: Siemens Energy & Automotive, Inc., Alpharetta, GA (US)

( * ) Notice: Subject to any disclaimer, the term of this patent is extended or adjusted under 35 U.S.C. 154(b) by 0 days.

(21) Appl. No.: 11/234,907

(22) Filed: Sep. 26, 2005

Related U.S. Application Data

(60) Provisional application No. 60/613,440, filed on Sep. 27, 2004.

(51) Int. Cl.
*G06F 15/00* (2006.01)

(52) U.S. Cl. .................... 702/58; 324/140 R

(58) Field of Classification Search ............. 702/58, 702/182–185, 57–59; 324/76.11, 140 R
See application file for complete search history.

(56) References Cited

U.S. PATENT DOCUMENTS

| | | | |
|---|---|---|---|
| 4,601,273 A | * | 7/1986 | Kitahara et al. ............ 73/23.32 |
| 5,670,864 A | * | 9/1997 | Marx et al. ................. 323/211 |
| 2002/0008523 A1 | * | 1/2002 | Klang ......................... 324/429 |
| 2006/0055246 A1 | * | 3/2006 | Jansen et al. ................. 307/87 |

* cited by examiner

*Primary Examiner*—Edward Raymond

(57) ABSTRACT

Certain exemplary embodiments can comprise a method for detecting a circuit fault, comprising: for a sensor coupleable to an input circuit, the sensor characterized by an output signal operating voltage range: automatically causing the sensor to be electrically disconnected from the input circuit; automatically causing an invalid sensor voltage to be applied to the input circuit, the invalid sensor voltage having a value outside the output signal operating voltage range for the sensor; automatically causing the invalid sensor voltage to be removed from the input circuit; automatically causing the sensor to be electrically connected to the input circuit; and, in the event that an input circuit voltage value is outside the output signal operating voltage range for the sensor, automatically providing notification that a circuit fault is associated with the sensor.

20 Claims, 3 Drawing Sheets

SYSTEMS, METHODS, AND DEVICES FOR DETECTING CIRCUIT FAULTS

CROSS-REFERENCES TO RELATED APPLICATIONS

This application claims priority to, and incorporates by reference herein in its entirety, now abandoned U.S. Provisional Patent Application Ser. No. 60/613,440, filed 27 Sep. 2004.

BACKGROUND

Measuring systems often comprise and/or interface with numerous sensors, several and/or each of which can substantially simultaneously output, provide, and/or transmit a signal indicative of a value of a detected and/or measured physical parameter, such as a position, temperature, pressure, flowrate, voltage, current, etc. Such sensor signals can be received by a receiver such as a data logger, and embedded system, a microcontroller, and/or an automated monitoring and/or control system, such as a programmable logic controller (PLC). To manage a potentially large number of incoming sensor signals, such measuring systems and/or receivers can utilize multiplexing (and/or de-multiplexing), such as time-division multiplexing, frequency-division multiplexing, and/or wave-division multiplexing, etc., to extract each sensor signal from its respective time slice, frequency, wavelength, channel, sub-channel, etc.

From the receiver's perspective, there is a possibility that a received sensor signal indicates a parameter value that is inaccurate and/or other than what was output and/or transmitted, potentially even if the received value is within a range of expected, reasonable, and/or valid values for that sensor's parameter. Such anomalies can occur because of a fault, such as a break in a wire or conductor, corrosion-generated high resistance in a conductor and/or junction, an induced voltage and/or current due to a neighboring conductor and/or magnetic field, multiple sensors connected to a conductor intended for a single sensor, ground faults due to failures in conductor insulation, arc faults, poor insulation, poor shielding, etc. Thus, it can be desirable to test the sensor circuit to detect if a fault is occurring.

To detect certain faults, a measuring system can utilize a stimulus circuit that can apply a stimulus, bias, and/or voltage to the sensor circuit, either continuously or in a pulsed manner, which can force the received and/or input sensor signal to a known "invalid" state and/or value if a fault occurs. The application of a constant stimulus, however, can add a constant error and/or distortion to the received signal. The application of a pulsed stimulus can cause time-varying perturbations to the received signal, which can corrupt logged data and/or make data analysis more difficult. Even if the perturbations are allowed to dissipate, the pulsed stimulus can add considerable additional time to the multiplexed scan time for each channel and/or sub-channel. Hence, improved systems, methods, and/or devices for detecting circuit faults, such as sensor circuit faults, is disclosed.

SUMMARY

Certain exemplary embodiments can comprise a method for detecting one or more circuit faults. The method can utilize at least one stimulus and/or input circuit that is coupled to and/or controlled by a microcontroller, which can report to a monitoring, supervisory, and/or SCADA system, such as a PLC. Any number of multiplexed sensor signals can be provided to the input circuit, each sensor characterized by an expected and/or valid output signal operating voltage range. For each sensor coupled to the input circuit, via instructions stored in the microcontroller, the microcontroller can: automatically cause: the sensor to be electrically disconnected from the input circuit; an invalid sensor voltage to be applied to the input circuit, the invalid sensor voltage having a value outside the output signal operating voltage range for the sensor; the invalid sensor voltage to be removed from the input circuit; the sensor to be electrically connected to the input circuit; and, if an input circuit voltage value is outside the output signal operating voltage range for the sensor, automatically provide notification that a circuit fault is associated with the sensor.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
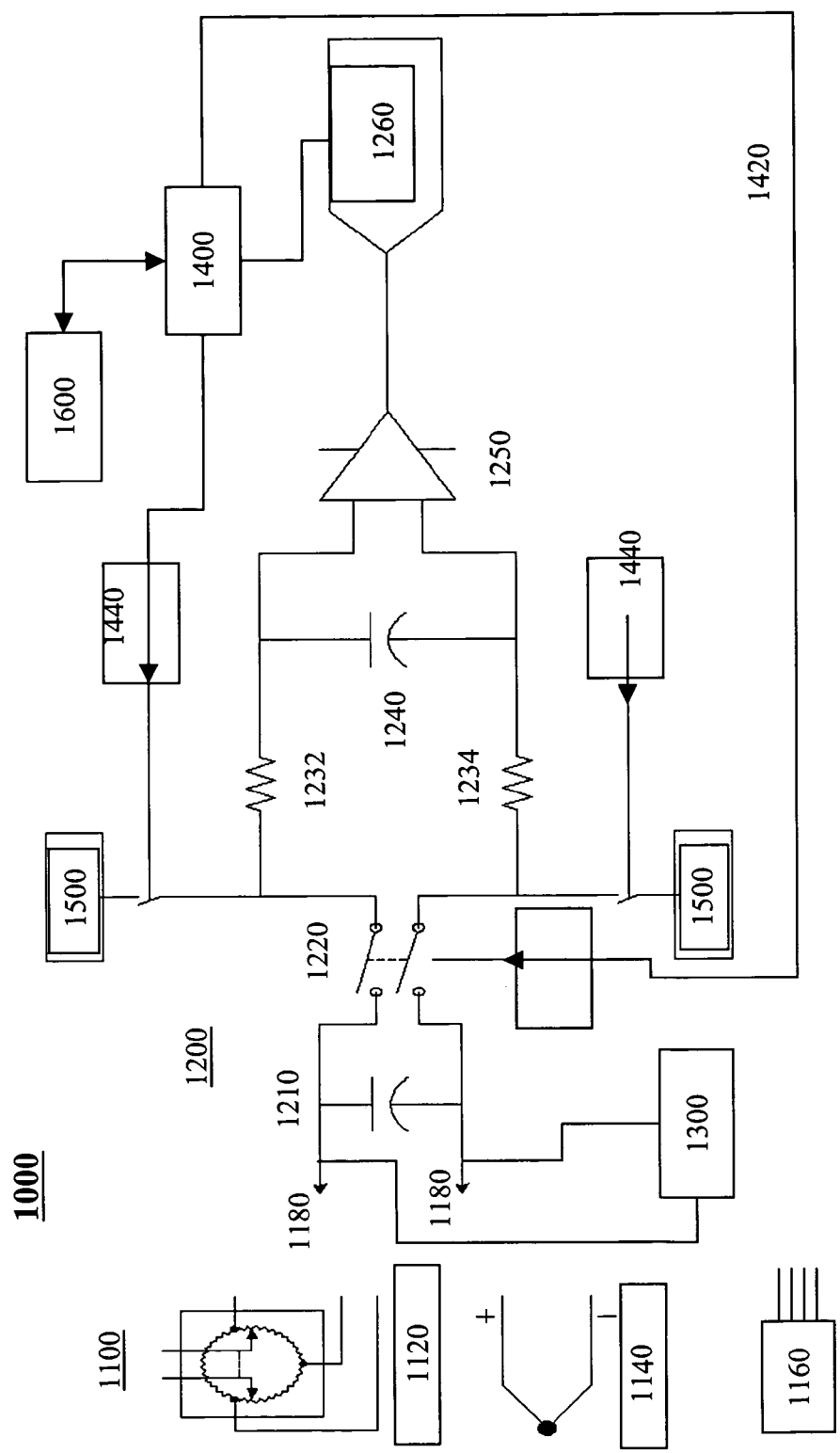
FIG. 1 is a schematic of an exemplary embodiment of a system 1000.

When the following terms are used substantively herein, the accompanying definitions apply:

a—at least one.
activity—an action, act, step, and/or process or portion thereof.
adapted to—made suitable or fit for a specific use or situation.
analog-to-digital converter—a device that transforms an analog value to a digital value.
and/or—either in conjunction with or in alternative to.
apparatus—an appliance or device for a particular purpose.
application—the act of applying.
apply—to put to, on, and/or into action.
automatically—acting or operating in a manner essentially independent of external influence or control. For example, an automatic light switch can turn on upon "seeing" a person in its view, without the person manually operating the light switch.
broken wire—an electrical conductor that fails to conduct or conducts very poorly.
can—is capable of, in at least some embodiments.
capacitor—a passive electronic component that holds a charge in the form of an electrostatic field.
cause—to bring about, provoke, elicit, and/or effect.
channel selector—a device adapted to switch a channel.
characterize—to describe the qualities or peculiarities of.
circuit—a configuration of electrically or electro-magnetically connected components and/or devices.
circuit fault—a defect in a conductor and/or system of conductors through which electric current flows.
communicatively—linking in a manner that facilitates communications.
comprising—including but not limited to.
connect—to join, link, and/or physically attach.
couple—to join, connect, and/or link two things together.

data—distinct pieces of information, usually formatted in a special or predetermined way and/or organized to express concepts.

data logger—a device adapted to record a time series of data points.

define—to establish the outline, form, and/or structure of.

detect—to sense or perceive.

device—a machine, manufacture, and/or collection thereof.

effect—(v.) to bring about, provoke, elicit, and/or cause.

electrically—of, relating to, producing, or operated by electricity.

elicit—to bring about, provoke, cause, and/or effect.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identity—the collective aspect of the set of characteristics by which a thing is definitively recognizable and/or known, and/or information that distinguishes an entity.

in the event that—if.

information device—any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input circuit—a configuration of electrically or electromagnetically connected components and/or devices adapted to convert and/or modify a signal, such as by converting the signal from analog to digital.

input circuit voltage value—a definable, assignable, and/or measurable quantity of electromotive force or potential difference applied to and/or measured in a configuration of electrically or electromagnetically connected components and/or devices adapted to convert and/or modify a signal, such as by converting the signal from analog to digital.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

invalid—not factually valid; null.

invalid sensor voltage—a voltage having a value that is outside a range of voltage values that a sensor is designed to provide.

machine instructions—directions adapted to cause a machine to perform a particular operation or function.

machine readable medium—a physical structure from which a machine can obtain data and/or information. Examples include a memory, memory device, punch cards, bar code, etc.

may—is allowed to, in at least some embodiments.

measure—to ascertain the dimensions, quantity, or capacity of.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

microcontroller—a single highly integrated chip comprising a CPU, RAM, some form of ROM, I/O ports, and timers, and often adapted to perform real-time computing. Unlike a general-purpose computer, a microcontroller is designed for a very specific task—to control a particular system. As a result, the parts can be simplified and reduced, which cuts down on production costs.

multiplex—to send two or more messages or signals substantially simultaneously on the same wire or channel.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

notification—a communication.

operating—arising out of normal and/or functional operations of an entity.

operational amplifier (op-amp)—A very high voltage gain amplifier that has two differentially connected inputs, one inverting (−) and one non-inverting (+) and with one output voltage, which is the difference between the inverting and non-inverting inputs, multiplied by the open-loop gain of the op-amp. Thus, the output is ideally at zero volts when both inputs are at zero volts. An op-amp can serve as a general-purpose building-block for constructing analog circuits. Common circuits that can be built with op-amps are amplifiers, filters, and comparators. Modern op-amps are normally built as an integrated circuit, though occasionally with discrete transistors, and generally have uniform parameters with standardized packaging and power supply needs.

output—something produced in a given time period.

outside—beyond a range, boundary, and/or limit.

packet—a generic term for a bundle of data organized in a specific way for transmission, and comprising the data to be transmitted and certain control information.

perform—to do and/or to begin and carry through to completion.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

programmable logic controller (PLC)—a microprocessor-based, real-time computing device that is used at least to automatically monitor the status of field-connected sensor inputs and automatically control attached devices (e.g., actuators, motor starters, solenoids, pilot lights/displays, speed drives, valves, etc.) according to a user-created program stored in memory. A PLC can provide automated switching, counting, arithmetic operations, complex data manipulation, logic, timing, sequencing, control, relay control, motion control, process control, distributed control, and/or monitoring of processes and/or machines of an industrial plant. Because of its precise and real-time timing and sequencing capabilities, a PLC can replace up to thousands of relays and cam timers, and is programmed using ladder logic or some form of structured programming language specified in IEC 61131-3, namely, FBD (Function Block Diagram), LD (Ladder Diagram), ST (Structured Text, Pascal type language), IL (Instruction List) and SFC (Sequential Function Chart). PLC hardware often has very good redundancy and fail-over capabilities. A PLC can use a Human-Machine Interface (HMI) for interacting with people for configuration, alarm reporting, and/or control.

provide—to give, furnish, supply, and/or send.

provoke—to bring about, cause, elicit, and/or effect.

range—an amount or extent of variation.

receive—to take, obtain, acquire, take in, and/or get.

record—to register or indicate in writing or other permanent form.

removal—the act of removing.

remove—to withdraw, take away, and/or cease applying.

render—make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

resistance temperature detector—a temperature-sensing device that changes resistance at a predetermined rate in response to changes in temperature.

sensor—a device used to measure a physical quantity (e.g., temperature, pressure, capacitance, and/or loudness, etc.) and convert that physical quantity into a signal of some kind (e.g., voltage, current, power, etc.). A sensor can be any instrument such as, for example, any instrument measuring pressure, temperature, flow, mass, heat, light, sound, humidity, proximity, position, velocity, vibration, voltage, current, capacitance, resistance, inductance, and/or electromagnetic radiation, etc. Such instruments can comprise, for example, proximity switches, photo sensors, thermocouples, level indicating devices, speed sensors, electrical voltage indicators, electrical current indicators, on/off indicators, and/or flowmeters, etc.

set—a related plurality.

signal—detectable transmitted energy that can be used to carry information and/or an impulse and/or a fluctuating electric quantity, such as voltage, current, or electric field strength, whose variations represent coded information.

store—to place, hold, and/or retain data, typically in a memory.

substantially—to a great extent or degree.

system—a collection of mechanisms, devices, data, and/or instructions, the collection designed to perform one or more specific functions.

thermocouple—a temperature-sensing element which converts thermal energy directly into electrical energy. In its basic form it consists of two dissimilar metallic conductors connected in a closed loop. Each junction forms a thermocouple. If one thermocouple is maintained at a temperature different from that of the other, an electrical current proportional to this temperature difference will flow in the circuit. The value varies with the materials used.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a definable, assigned, measured, and/or calculated quantity.

via—by way of and/or utilizing.

voltage—an electromotive force or potential difference, usually expressed in volts.

wire break fault—a circuit defect due to an interruption in a conductor.

DETAILED DESCRIPTION

Certain exemplary embodiments can comprise a method for detecting a circuit fault, comprising: for a sensor coupleable to an input circuit, the sensor characterized by an output signal operating voltage range: automatically causing the sensor to be electrically disconnected from the input circuit; automatically causing an invalid sensor voltage to be applied to the input circuit, the invalid sensor voltage having a value outside the output signal operating voltage range for the sensor; automatically causing the invalid sensor voltage to be removed from the input circuit; automatically causing the sensor to be electrically connected to the input circuit; and, in the event that an input circuit voltage value is outside the output signal operating voltage range for the sensor, automatically providing notification that a circuit fault is associated with the sensor.

FIG. 1 is a side view of an exemplary embodiment of a system 1000, which can comprise any number of sensors 1100, such as a position sensor 1120, a thermocouple 1140, and/or an RTD 1160. Note that a sensor can have any number of conductors attached thereto.

Electrically coupled and/or coupleable to one or more sensors 1100, such as via multiplexed sensor circuit(s) 1180, can be an input circuit 1200 and/or a data logger 1300. Input circuit 1200 can comprise a capacitor 1210, which can help hold a voltage provide by and/or to sensor 1100 and/or sensor circuit 1180. A switch and/or channel selector 1220, can be used to isolate the input circuit from one or more sensors 1100 and/or sensor circuits 1180, and/or to select a particular sensor 1100 and/or sensor circuit 1180 for testing. Resistors 1232, 1234 can be used to match impedance and/or prevent a large applied voltage from harming input circuit 1200. Capacitor 1240 can help hold a voltage applied to input circuit 1200, whether by a sensor 1100, a sensor circuit 1180, or a stimulus circuit 1500. An operational amplifier 1250 can determine a differential voltage provided to input circuit 1200, which can be indicative of a received signal value and/or an input circuit voltage value. An analog-to-digital converter 1260 can convert an analog received signal value and/or input circuit voltage value to a digital value. A microcontroller 1400 can receive the digital value, interpret that value, and/or notify a communicatively coupled monitoring, supervisory, and/or SCADA system 1600, such as a PLC, of its interpretation of the received signal value and/or the status of the sensor 1100, sensor circuit 1180, and/or received signal value.

Any number of multiplexed sensor signals can be provided to input circuit 1200. Each sensor 1100 can be characterized by an expected and/or valid output signal operating voltage range. For example, for a pressure sensor, an output signal voltage, received signal voltage, and/or input circuit voltage ranging from about 1.5 volts to about 3.5 volts might be considered "valid" and a voltage value below 1.5 volts or above 3.5 volts might be considered "invalid" and/or consistent with a sensor fault and/or a circuit fault.

For each sensor 1100 coupled to the input circuit 1200, via instructions stored in microcontroller 1400 and/or coupled thereto, microcontroller 1400 can:

repeatedly and/or automatically cause any of the following activities:

1) sensor 1100 and/or sensor circuit 1180 to be electrically disconnected from input circuit 1200, such as via control signal sent over channel, path, and/or conductor 1420;

2) an invalid sensor voltage to be applied by stimulus circuit 1500 to input circuit 1200, such as via a control signal sent over channel, path, and/or conductor 1440, the invalid sensor voltage having a value outside the output signal operating voltage range for sensor 1100;

3) stimulus circuit 1500 and/or the invalid sensor voltage to be removed from input circuit 120, such as via a control signal sent over channel, path, and/or conductor 1440;

4) sensor 1100 and/or sensor circuit 1180 to be electrically connected to input circuit 1200, such as via a control signal sent over channel, path, and/or conductor 1420; and, 5) if an input circuit voltage value is outside the output signal operating voltage range for sensor 1100, automatically provide notification, such as to monitoring system 1600, that a circuit fault is associated with sensor 1100 and/or sensor circuit 1180. If instead, the input circuit voltage value is within the output signal operating voltage range for the sensor, the instructions can cause microcontroller 1400 to automatically provide notification of the input circuit voltage value, which can be approximately and/or precisely the value of the received signal voltage and/or the voltage output by sensor 1100.

Note that activities 1–5 above can be repeated for each of the multiplexed sensors and/or the signals associated therewith, and that activities 3 and 4 can be reversed.

Thus, if there is a substantial circuit fault, the invalid voltage applied to input circuit 1200 likely will not quickly dissipate upon re-connection of sensor 1100 and/or sensor circuit 1180, and instead will likely linger for sufficient time for microcontroller 1400 to recognize that a circuit fault exists. This can hold particularly true for circuit faults such as wire breaks, and also can be true for other types of circuit vaults. "Partial" circuit faults, such as high resistance, can be indicated by a measured voltage that slowly dissipates once the stimulus circuit is disconnected and the sensor circuit reconnected. Intermittent circuit faults can be indicated by a difference between the stability of the measured voltage when microcontroller 1400 is testing the received signal versus simply detecting the received sensor signal. Similar analysis of the measured voltage, received signal voltage, input circuit voltage, etc., and/or time-varying changes therein, can yield additional insights into the condition, health, and/or status of sensors 1100 and/or sensor circuits 1180.

Microcontroller 1400 can be programmed via monitoring system 1600 and/or via a human/machine interface coupled to microcontroller 1400. For example, microcontroller 1400 can comprise a flash ROM, such as an EEPROM, via which instructions created and/or stored on monitoring system 1600 are transferred to microcontroller 1400. Those instructions can comprise instructions for receiving and/or storing an identity of one or more sensors 1100 and receiving and/or storing a corresponding output signal operating voltage range for each sensor 1100. Thus, for example, via its instructions, microcontroller 1400 can "know" that a valid operating voltage range for pressure sensor P101 is 1.5 volts to 3.5 volts.

Via further instructions, microcontroller 1400 can measure the input circuit voltage, cause the output signal voltage to be recorded, and/or transmit the notification to monitoring system 1600.

Figure 2:
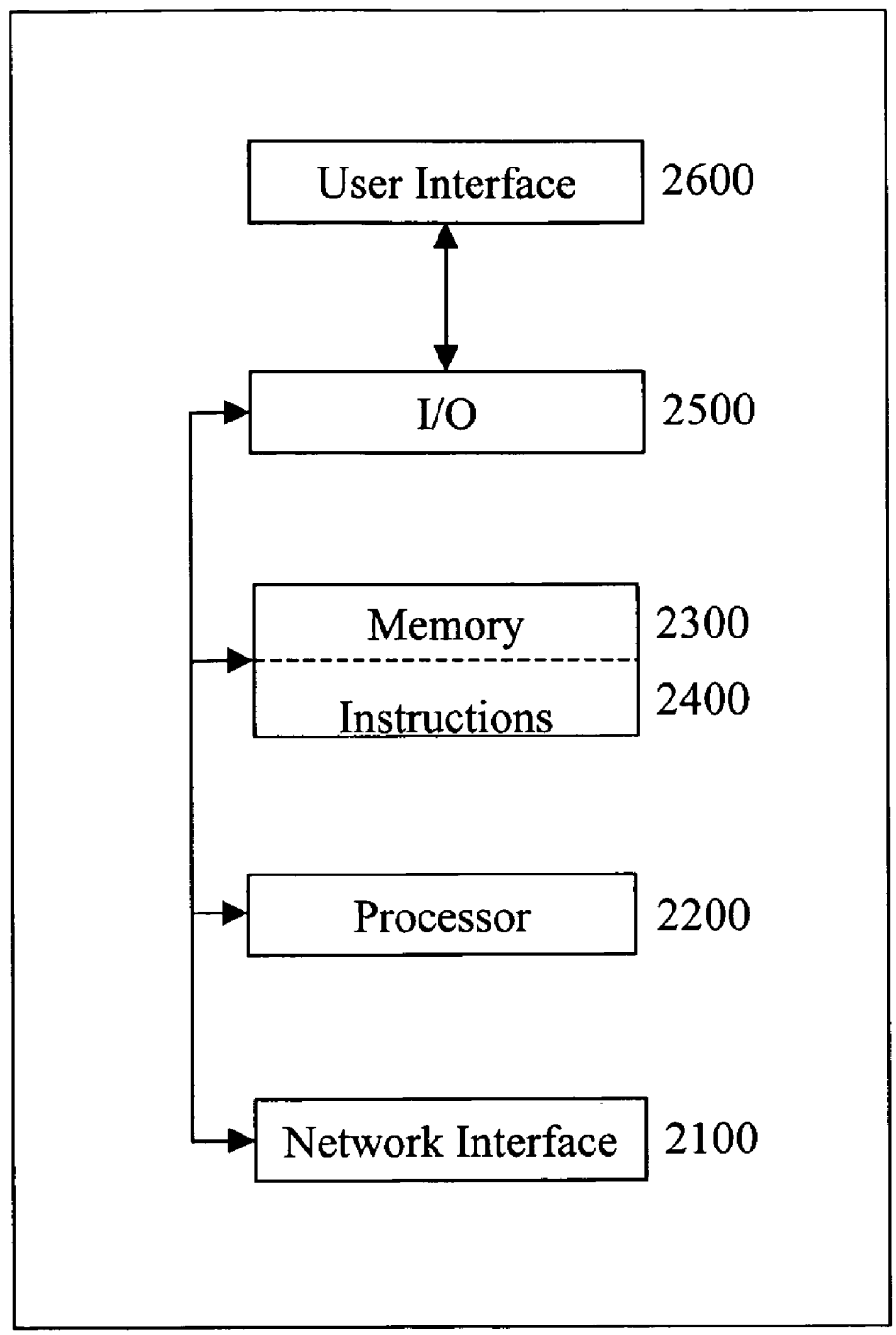
FIG. 2 is a block diagram of an exemplary embodiment of an information device 2000.

FIG. 2 is a block diagram of an exemplary embodiment of an information device 2000, which in certain operative embodiments can comprise, for example, microcontroller 1400 and/or monitoring system 1600 of FIG. 1. Information device 2000 can comprise any of numerous components, such as for example, one or more network interfaces 2100, one or more processors 2200, one or more memories 2300 containing instructions 2400, one or more input/output (I/O) devices 2500, and/or one or more user interfaces 2600 coupled to I/O device 2500, etc.

In certain exemplary embodiments, via one or more user interfaces 2600, such as a graphical user interface presented by a microcontroller and/or monitoring system, a user can view a rendering of information related to programming, operating, and/or monitoring the microcontroller, and/or a status of one or more sensors, sensor circuits, input circuits, and/or stimulus circuits.

Figure 3:
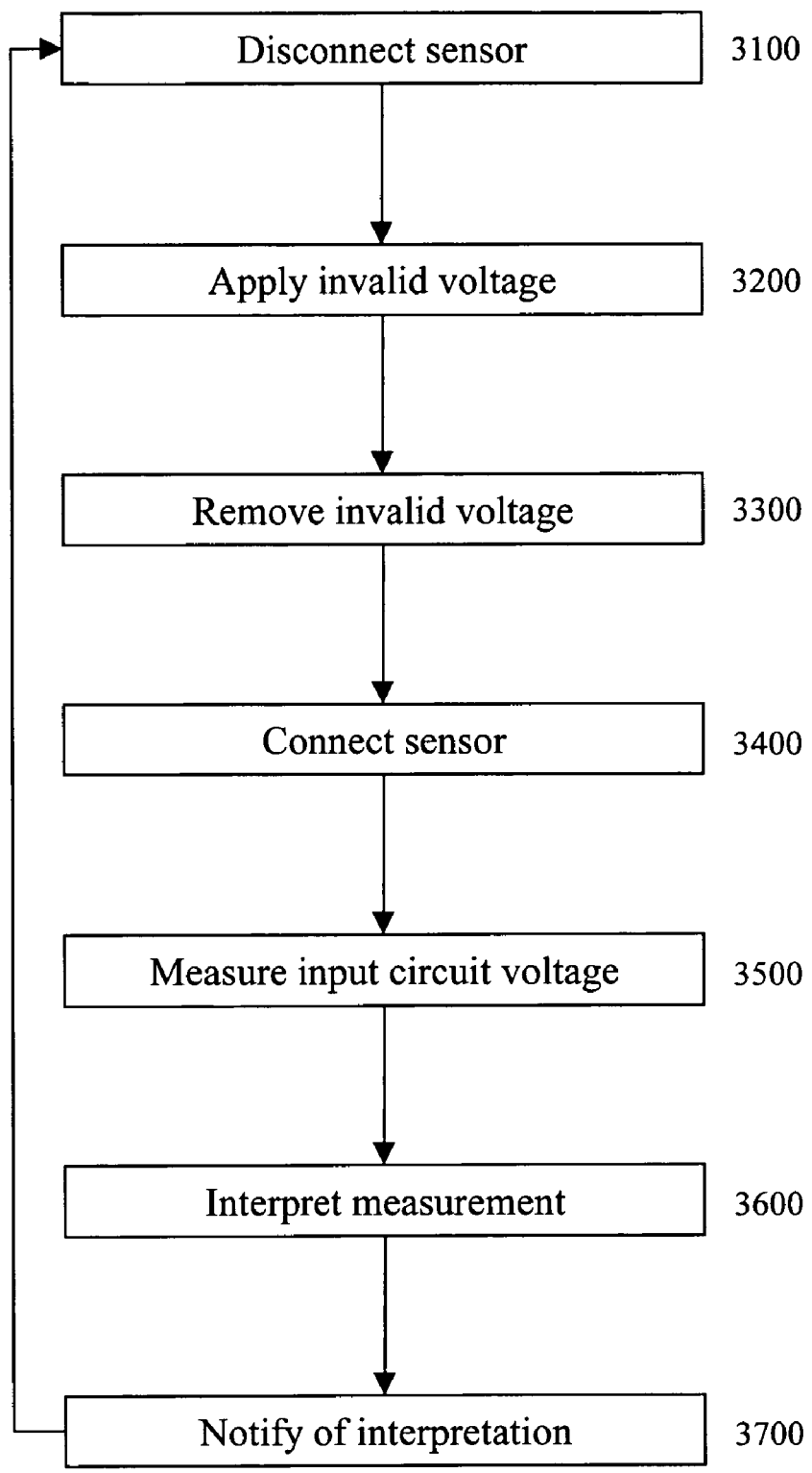
FIG. 3 is a flowchart of an exemplary embodiment of a method 3000.

FIG. 3 is a flowchart of an exemplary embodiment of a method 3000. At activity 3100, a sensor and/or sensor circuit can be disconnected and/or caused to be disconnected from the input circuit. At activity 3200, an invalid voltage can be applied to the input circuit. At activity 3300, the invalid input voltage can be removed from the input circuit. At activity 3400, the sensor and/or sensor circuit can be re-connected, such as via a selected input channel, to the input circuit. Note that activities 3300 and 3400 can be reversed. At activity 3500, a voltage in the input circuit, such as across the op-amp, can be measured. At activity 3600, the measured voltage value can be interpreted. At activity 3700, if the measured voltage value remains invalid, a notification can be provided that a circuit fault exists. If the measured voltage value has returned to a value that is valid, a notification of that value can be provided, that value being approximately and/or precisely indicative of the value output by the sensor. Other interpretations and/or notifications are also possible.

Certain exemplary embodiments were simulated using Orcad's PSpice simulator to determine if one or more disclosed systems, methods, and/or devices would work under ideal conditions. The simulation results were positive. Certain exemplary embodiments were then implemented in a prototype module. The test results were again positive.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, such as via an explicit definition, there is no requirement for the inclusion in any claim herein (or of any claim of any application claiming priority hereto) of any particular described or illustrated characteristic, function, activity, or element, any particular sequence of activities, or any particular interrelationship of elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method for detecting a circuit fault, comprising:
  for a measurement system comprising a sensor coupleable to an input circuit, the sensor characterized by an output signal and an output signal operating voltage range, the input circuit comprising a microcontroller:
    automatically causing the sensor to be electrically disconnected from the input circuit;
    while the sensor is electrically disconnected from the input circuit, automatically provoking an invalid sensor voltage to be applied to the input circuit, the invalid sensor voltage having a value outside the output signal operating voltage range for the sensor;

after application of the invalid sensor voltage to the input circuit, automatically eliciting the invalid sensor voltage to be removed from the input circuit;

after application of the invalid sensor voltage to the input circuit, automatically effecting the sensor to be electrically connected to the input circuit; and then, in the event that an input circuit voltage value is outside the output signal operating voltage range for the sensor, automatically providing notification that a circuit fault is associated with the sensor.

2. The method of claim 1, further comprising:
receiving an identity of the sensor.

3. The method of claim 1, further comprising:
receiving the output signal operating voltage range for the sensor.

4. The method of claim 1, further comprising:
automatically measuring the input circuit voltage.

5. The method of claim 1, further comprising:
in the event that the input circuit voltage value is within the output signal operating voltage range for the sensor, automatically providing notification of the input circuit voltage value.

6. The method of claim 1, further comprising:
recording the output signal.

7. The method of claim 1, further comprising:
performing said method for a plurality of multiplexed sensors.

8. The method of claim 1, further comprising:
transmitting the notification to a programmable logic controller.

9. The method of claim 1, wherein:
said method is performed repeatedly.

10. The method of claim 1, wherein:
the input circuit comprises a channel selector.

11. The method of claim 1, wherein:
the input circuit comprises an operational amplifier.

12. The method of claim 1, wherein:
the input circuit comprises an analog-to-digital converter.

13. The method of claim 1, wherein:
the input circuit comprises a capacitor.

14. The method of claim 1, wherein:
a data logger is electrically connected to the sensor.

15. The method of claim 1, wherein:
a programmable logic controller is communicatively coupled to the microcontroller.

16. The method of claim 1, wherein:
the sensor is a thermocouple.

17. The method of claim 1, wherein:
the sensor is a resistance temperature detector.

18. The method of claim 1, wherein:
the sensor is a position sensor.

19. A machine-readable medium storing machine instructions for a plurality of activities, the activities comprising:
for a measurement system comprising a sensor coupleable to an input circuit, the sensor characterized by an output signal and an output signal operating voltage range, the input circuit comprising a microcontroller:
automatically causing the sensor to be electrically disconnected from the input circuit;
with the sensor electrically disconnected from the input circuit, automatically provoking an invalid sensor voltage to be applied to the input circuit, the invalid sensor voltage having a value outside the output signal operating voltage range for the sensor;
upon application of the invalid sensor voltage to the input circuit, automatically eliciting the invalid sensor voltage to be removed from the input circuit;
after removal of the invalid sensor voltage from the input circuit, automatically effecting the sensor to be electrically connected to the input circuit; and
thereafter, in the event that an input circuit voltage value is outside the output signal operating voltage range for the sensor, automatically providing notification that a circuit fault is associated with the sensor.

20. A system for detecting circuit faults, comprising:
an input circuit coupleable to a sensor, the sensor characterized by an output signal and an output signal operating voltage range, the input circuit comprising:
a microcontroller adapted to:
automatically cause the sensor to be electrically disconnected from the input circuit;
with the sensor electrically disconnected from the input circuit, automatically provoke an invalid sensor voltage to be applied to the input circuit, the invalid sensor voltage having a value outside the output signal operating voltage range for the sensor;
upon application of the invalid sensor voltage to the input circuit, automatically elicit the invalid sensor voltage to be removed from the input circuit;
after removal of the invalid sensor voltage from the input circuit, automatically effect the sensor to be electrically connected to the input circuit; and
thereafter, in the event that an input circuit voltage value is outside the output signal operating voltage range for the sensor, automatically provide notification a circuit fault is associated with the sensor.

* * * * *